United States Patent [19] [11] Patent Number: 4,540,588
Bartfield [45] Date of Patent: Sep. 10, 1985

[54] APPARATUS AND METHOD FOR DISPENSING INDIVIDUAL ORDERS OF A HOT FOOD PRODUCT AND COMPONENTS USABLE THEREWITH

[75] Inventor: William Bartfield, Sherman Oaks, Calif.

[73] Assignee: Prize Frize, Inc., Sherman Oaks, Calif.

[21] Appl. No.: 593,584

[22] Filed: Mar. 26, 1984

Related U.S. Application Data

[62] Division of Ser. No. 352,579, Feb. 26, 1982, Pat. No. 4,438,683.

[51] Int. Cl.³ ............... G01N 33/00; A47J 37/12
[52] U.S. Cl. .................... 426/231; 99/330; 99/353; 99/407; 99/443 C; 426/509; 426/523
[58] Field of Search .............. 426/231, 429, 430, 431, 426/509, 441, 523, 512; 221/150 A; 222/372; 99/330, 335, 353, 355, 356, 357, 407, 443 C, 483, 536, 430; 194/10

[56] References Cited

U.S. PATENT DOCUMENTS

| 2,869,475 | 1/1959 | Bobo | 103/233 |
| 3,468,354 | 2/1967 | Reachert | 146/78 |
| 3,685,432 | 8/1972 | Hoeberigs | 99/357 |
| 3,703,246 | 11/1972 | Horak | 222/17 |
| 3,771,937 | 11/1973 | Harmon et al. | 425/161 |
| 3,885,056 | 5/1975 | Smith et al. | 426/441 |
| 3,997,684 | 12/1976 | Willard | 426/550 |
| 4,096,791 | 6/1978 | Weiss et al. | 99/353 |
| 4,252,252 | 2/1981 | Gross et al. | 222/14 |
| 4,359,935 | 11/1982 | Murray | 99/331 |

FOREIGN PATENT DOCUMENTS 2000417 12/1971 Fed. Rep. of Germany .

Primary Examiner—George Yeung
Attorney, Agent, or Firm—Fleit, Jacobson, Cohn & Price

[57] ABSTRACT

An apparatus and method for dispensing individual orders of a hot food product. The apparatus is designed to use a food product provided in a dehydrated form, such food product being readily reconstituted by the addition of a liquid. The apparatus includes a mechanism for delivering an amount of dehydrated food product corresponding to the size of an individual order, a chamber and system for rehydrating the product, a mechanism for cutting rehydrated product forced out of the chamber, a cooking device for the severed product, and a conveyor for delivering cooked product. The invention further provides a lever that combines a closure for a carrier of dehydrated product with a shower head for furnishing water for reconstituting the product, and provides a device for cooking and for conveying rehydrated product.

15 Claims, 17 Drawing Figures

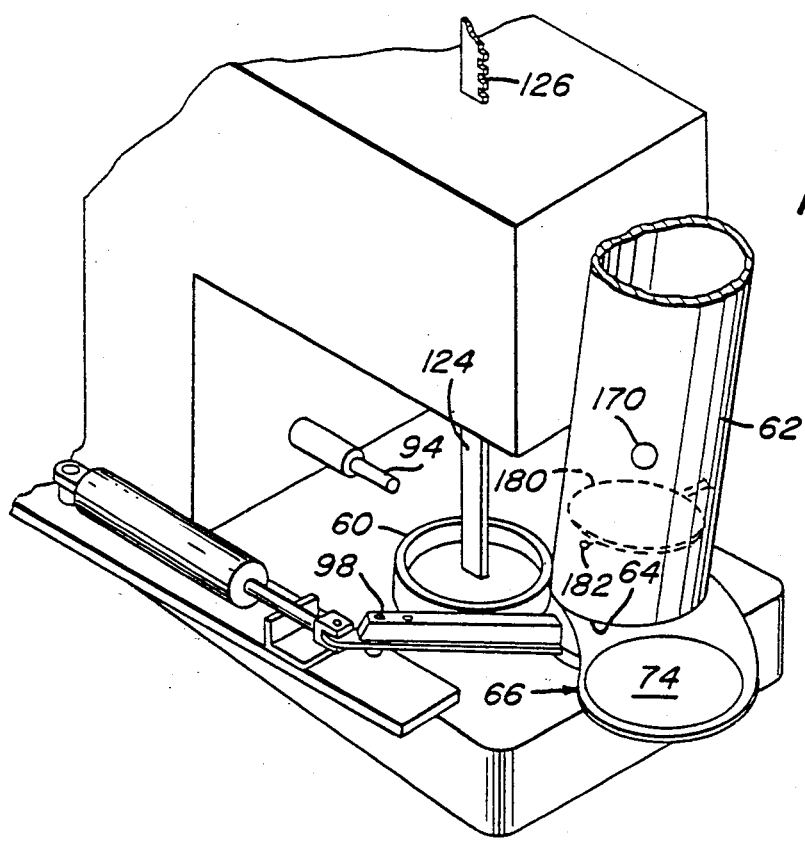
FIG. 2
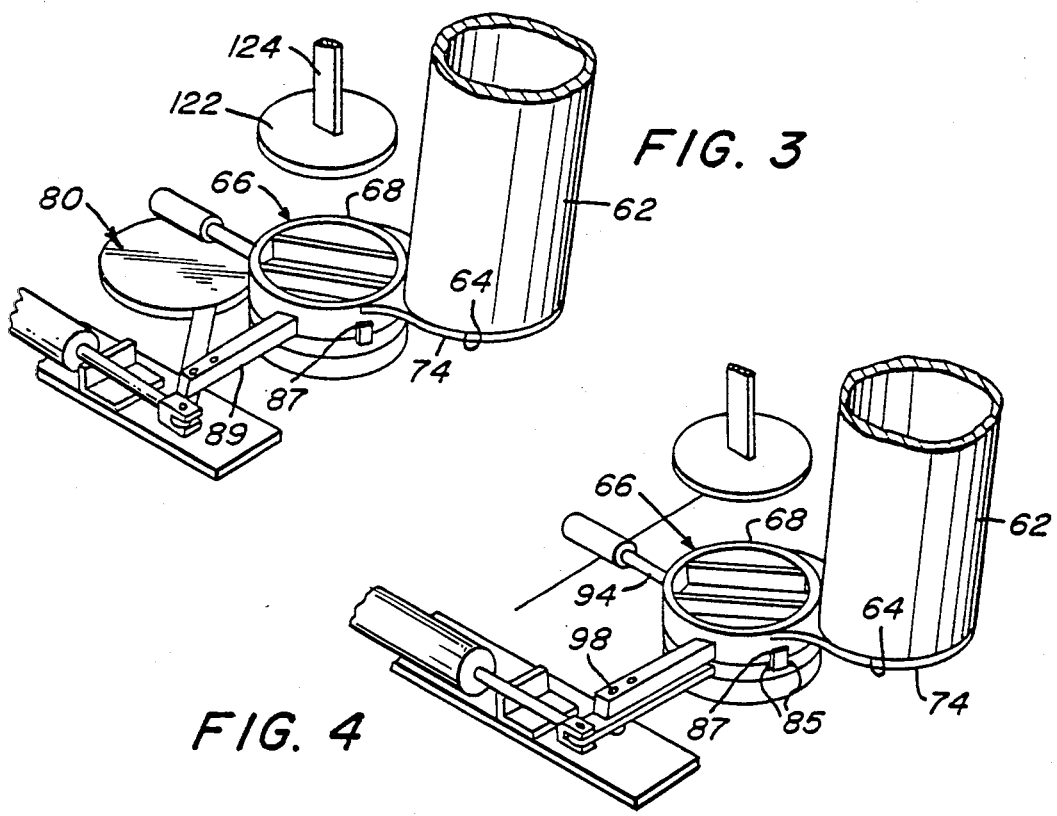
FIG. 3
FIG. 4

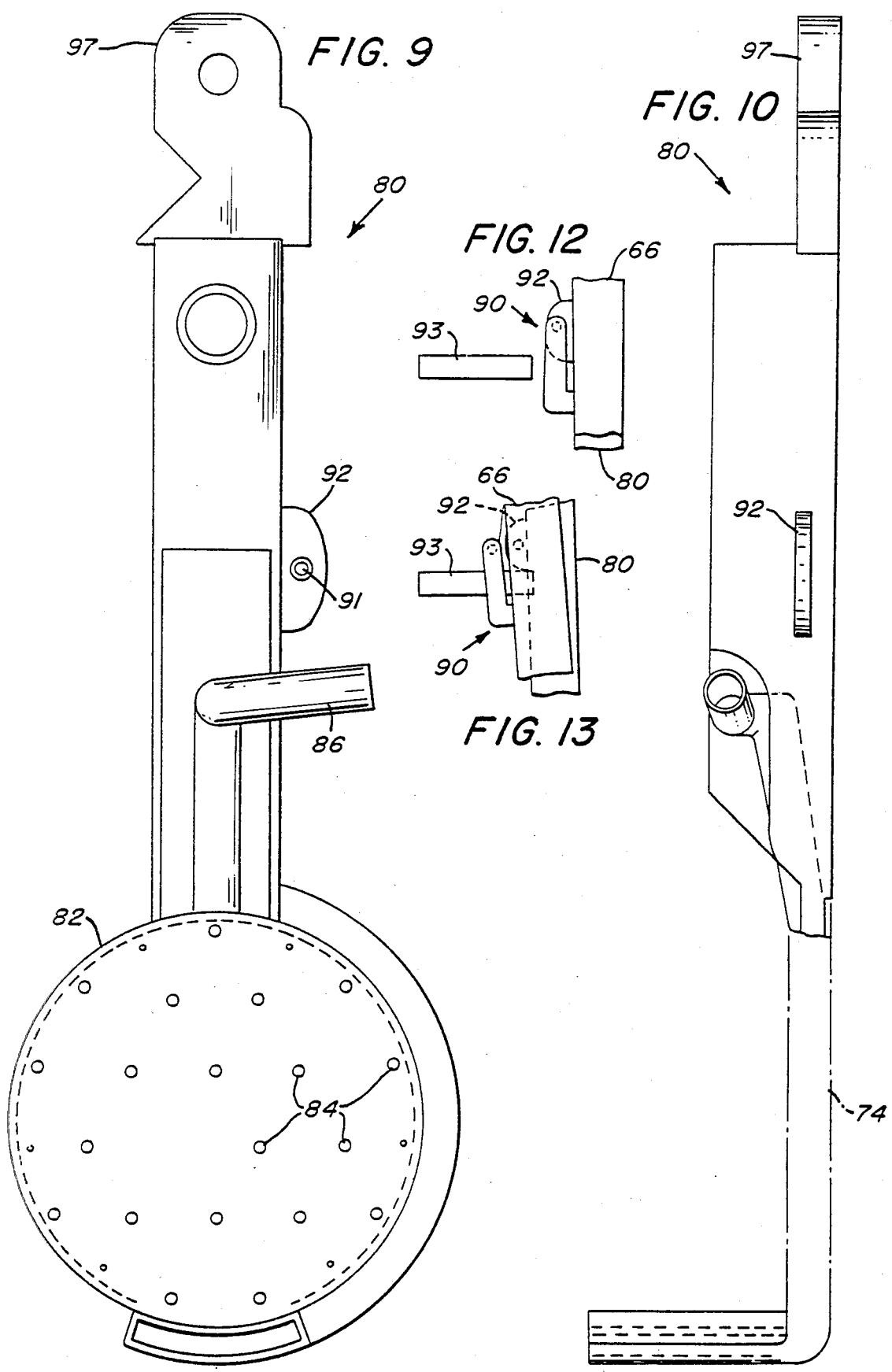

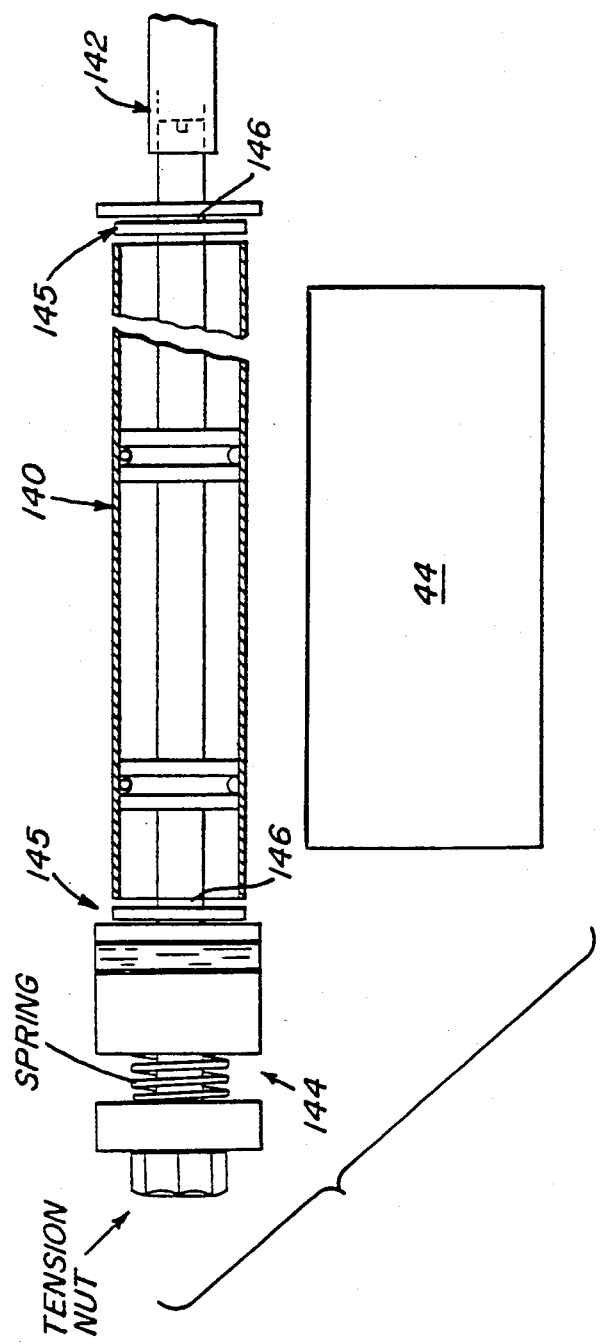

APPARATUS AND METHOD FOR DISPENSING INDIVIDUAL ORDERS OF A HOT FOOD PRODUCT AND COMPONENTS USABLE THEREWITH

This is a divisional of application Ser. No. 352,579, filed Feb. 26, 1982, now U.S. Pat. No. 4,438,683.

BACKGROUND OF THE INVENTION

1. Field of the Invention

The present invention relates to an apparatus, a method, and components of an apparatus for dispensing individual orders of a hot food product. More particularly, the invention relates to the provision of individual orders of a food product resembling french fries. The invention provides an apparatus and machine for reconstituting agglomerates of potato particles into homogenous dough, for dividing or separating the potato dough into pieces having the shape of french-fry-cut potato pieces, and for heating and browning the thus-formed pieces.

2. Description of the Prior Art

U.S. Pat. No. 3,622,355 describes a dry product and a process for making the product that can be reconstituted without mixing or agitation to form a uniform dough. French-fry-cut potato pieces can be formed from such dough by employing apparatus of the type described in U.S. Pat. No. 3,605,647, U.S. Pat. No. 3,764,345, U.S. Pat. No. 3,771,937, U.S. Pat. No. 3,782,969, U.S. Pat. No. 3,789,750, and U.S. Pat. No. 3,890,453.

Also known in the prior art are automatic machines for selling or dispensing fried foods. For instance, such machines are described in U.S. Pat. No. 3,448,677, U.S. Pat. No. 3,690,247, and U.S. Pat. No. 3,818,820. A problem with machines of the type described in these patents is the relatively rapid deterioration of the raw materials used to make the dispensed product and the relatively limited raw materials storage capacity of the machines. Another problem with such machines is the relatively long period of time, in excess of two minutes, required to cook a fresh or frozen product. The product must be heated slow enough to thoroughly cook the center of the product, without overcooking the exterior. Such requirement places a limit on the temperature of the oil used to cook the product.

SUMMARY OF THE INVENTION

Accordingly, it is an object of the present invention to provide an apparatus and a method for dispensing individual orders of a hot food product, the food product being stored in a dehydrated form within the apparatus.

Another object of the present invention is to provide a device that both seals a carrier for dehydrated food product and supplies water to the food product after it has been delivered to a rehydrating cylinder.

Still another object of the present invention is to provide a combined heating and conveying apparatus for heating and browning food product and for delivering the food product to an outlet of a dispensing machine.

Yet another object is to provide a mechanically simple system for maintaining the level of heating or cooking liquid within a vessel or tank at a desired level or within a desired range.

The apparatus provided by the present invention includes storage means for storing a supply of food product to be dispensed in a dehydrated form. A supply device is provided for transferring a predetermined amount of dehydrated food product corresponding to the size of an individual order from an outlet of the storage means to a rehydrating chamber. Liquid is dispensed on the dehydrated product in the chamber to thereby reconstitute the food product. A piston forces the reconstituted product through a die positioned adjacent or within the outlet of the rehydrating chamber. A cutting device is provided adjacent the outlet of the die to sever individual pieces forced through the die by the piston. The individual severed pieces fall into a heated container of heating or cooking oil disposed beneath the rehydrating chamber. A conveyor is positioned above the cooking oil container for movement between a first position in which an end portion of the container is disposed beneath the level of cooking oil in the container and a second position in which the end portion is spaced above the level of cooking oil. When the conveyor is in the first position, it is driven in a direction to carry severed food product into the cooking oil. When the conveyor is in the second position, it is driven in a direction to carry the heated or cooked food product towards the outlet of the apparatus. Preferably, a dispensing sequence is initiated by a coin-operated or card control mechanism. Alternatively, a partial dispensing sequence is initiated after a predetermined lapse of time following the preceding dispensing operation.

In one embodiment, the storage means is a storage hopper sized to hold several hundred individual orders of agglomerate material. The hopper has a downwardly extending discharge duct. A movable vane is disposed in a lower portion of the duct for taking the weight of the material in the duct and hopper off of the supply device. The position of the vane is adjustable to compensate for variations in the weight of the agglomerate material resulting from variations in ambient conditions, such as humidity. The vane is movable into a position blocking discharge of material when the supply device is removed for cleaning.

It is preferable for the various components of the machine to be releasably interconnected to the frame of the machine to facilitate cleaning. For instance, the supply device and the device used to supply water are movable about a pivot pin inserted in a recess or slot. The pin is simply lifted upward out of the slot to allow removal of the water and agglomerate material supply devices.

Since the present invention is designed to dispense individual orders, control of the ratio of agglomerate material to water is more critical than in the prior art devices which are designed to mix several orders at a time. Control of the amount of agglomerate material is provided by appropriate sizing of the device used to transport material from the agglomerate hopper to the reconstituting chamber. Control of the amount of liquid is provided by a hydraulic system using a piston-cylinder device. Movement of the piston in one direction withdraws a precise amount of pre-heated water or other suitable liquid from a reservoir. Movement of the piston in the opposite direction delivers the water to a water distribution device positioned above the reconstituting chamber. The cylinder is heated so as to ensure that the water is delivered at the required temperature to the water distribution device.

The water distribution device is similar to a shower head and has a plurality of openings connected to a plenum that receives water from the cylinder. The plenum is sized to ensure even distribution of the water, and the water is delivered to the plenum at a rate that is fast enough to prevent trickling of water through only some of the openings and slow enough to prevent formation of a hydrostatic head. As a result, the water is delivered to and evenly distributed over the agglomerate material.

The agglomerate material used in the apparatus of the present invention is a pre-cooked product so that there is no need to cook the center of an individual piece. As a result, a relatively high temperature is used to quickly heat and brown the exterior of the individual pieces of food product. Individual orders can be heated and dispensed in sixty seconds or less. As one order is being heated, the reconstituting process for the next order is in progress so that heating of orders can occur on an almost continuous basis. This capability is extremely important when the apparatus is used in a cafeteria.

The invention, and its objects and advantages, will become more apparent from the detailed description of the preferred embodiment hereinafter presented.

BRIEF DESCRIPTION OF THE DRAWINGS

In the detailed description of the preferred embodiment of the invention hereinafter presented, reference is made to the accompanying drawings, in which:

FIG. 2 is a schematic representation of a portion of the apparatus of FIG. 1 prior to the initiation of a reconstitution cycle for an individual order;

FIG. 3 is a schematic partial view of the location of components of FIG. 2 after the initiation of the reconstituted cycle;

FIG. 4 is a view similar to FIG. 3 of the location of components during a subsequent portion of the reconstitution cycle;

FIG. 9 is a bottom plan view of one embodiment of a device for adding liquid to a dehydrated product;

FIG. 10 is a side view of the device of FIG. 9;

FIG. 12 is a top view schematically illustrating interengagement between two of the components during a portion of the reconstituting cycle;

FIG. 13 is a view similar to FIG. 12 illustrating separation of the components during another portion of the reconstituting cycle;

FIG. 16 is a schematic view of a portion of a conveying apparatus used in the heating and conveying portion of the apparatus of FIG. 1.

DESCRIPTION OF THE PREFERRED EMBODIMENT

Figure 1:
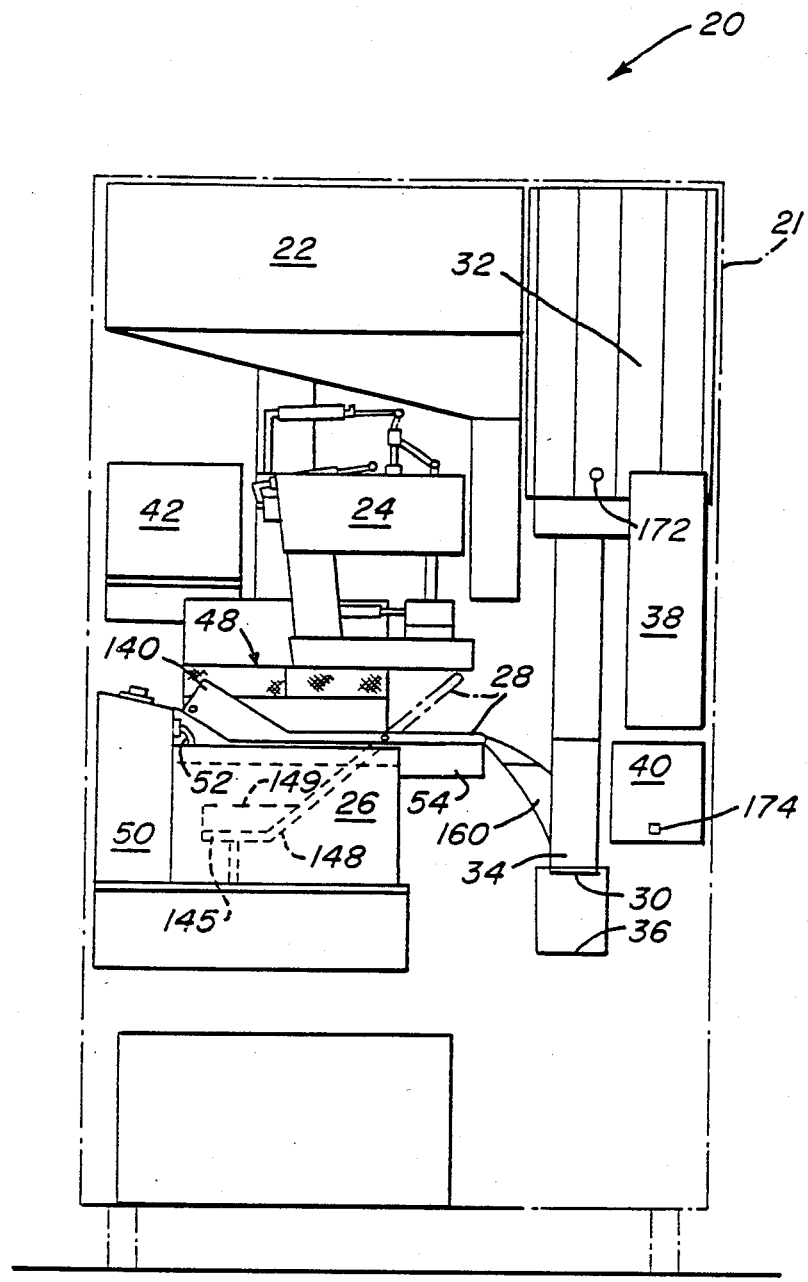
FIG. 1 is a schematic representation of one embodiment of an apparatus for dispensing individual orders of a hot food product according to the present invention.

The following description will be directed in particular to elements forming part of, or cooperating more directly with, the present invention. Elements not specifically shown or described herein are understood to be selectable from those known in the art.

Referring now to the drawings, and to FIG. 1 in particular, one embodiment of the present invention is illustrated and will be described in connection with an apparatus for dispensing individual orders, generally designated 20. The apparatus 20, in a preferred embodiment, is used to dispense individual orders of potato pieces that resemble french fried potatoes. Accordingly, the following description will be directed to the use of the apparatus to provide a food product resembling french fried potatoes. It, however, should be readily appreciated that the apparatus provided by the present invention can be used to dispense individual orders of other types of food products. Also, the components combined in the apparatus provided by the present invention can be incorporated in other systems used to mix or dispense food product.

The apparatus 20 has a housing or casing 21 that encloses the various components of the apparatus. Means for storing a supply of food product to be dispensed in a dehydrated form, such as a raw product hopper 22, is disposed in an upper portion of the housing 21. Means for rehydrating or mixing the food product, generally designated 24, are located in a central portion of the housing 21. Means for heating or cooking individual orders, generally designated 26, are located in a lower portion of the casing 21. Means for conveying heated or cooked product, generally designated 28, extend between the means for heating 26 and an outlet 30 of the apparatus. A dispenser 32 for cups or containers has an outlet chute 34 aligned with the outlet 30 for feeding containers to a platform 36. Preferably, a dispensing operation is initiated by insertion of one or more coins into a coin-operated mechanism, generally designated 38. It should be readily appreciated that the dispensing operation can also be initiated manually and under control of card operation.

A dispenser for accessories, generally designated 40, is actuatable by the mechanism 38. Preferably, the accessories include a supply of salt, a supply of catsup, and at least one napkin or similar product.

The hopper 22 is sized to contain a large amount of dehydrated product to be dispensed. For instance, a suitable product is an agglomerated dehydrated potato product of the type described in U.S. Pat. No. 3,622,355. Such product is an agglomerate of dehydrated potato particles that is reconstitutable without agitation to form a substantially homogenous dough even when disposed as a consolidated mass. Proper reconstitution requires controlled adding of a precise amount of water heated to a predetermined temperature. Variations in the amount, temperature, and rate of addition of water adversely effect the composition of the reconstituted product. The potato dough, when properly reconstituted, exhibits uniform cohesive characteristics that allow for ready division into shapes suitable for french frying. The hopper 22, alternatively, contains other suitable product to be dispensed.

The means for heating individual orders 26 includes a reservoir 42 for a suitable cooking liquid, such as oil. The reservoir 42 supplies the cooking liquid to a tank or other suitable container 44. Preferably, an electrically operated float level or other suitable sensing device is provided in the tank 44 to provide for automatic control of the level 46 of liquid within the tank. A preferred system for maintaining the level 46 at a desired point or within a desired range will be described in more detail subsequently. An air filtration system, generally designated 48, is provided above the tank 44. The system 48 includes a metal shroud fitting over the top of the tank 44 to prevent escape of fumes from the heated liquid, an electrical fan for removing the fumes, and a mesh screen or other suitable filter for removing contaminates from the fumes before they are exhausted to the atmosphere. Preferably, an oil filtration system is provided for removing cooking liquid from the tank, for filtering the liquid to remove contaminates, and for returning the filtered liquid to the tank. Preferably, the filtration system includes a mesh screen that is readily removable to facilitate cleaning. An electrical heater 50 has a heating element 52 positioned within the tank 44 to maintain the liquid at a desired temperature. Since the reconstituted product already has been cooked, the temperature can be maintained at a relatively high temperature to rapidly brown the exterior of individual food pieces. There is no need to cook the interior of the product. A container 54 for accumulating liquid drained from the heated product is provided underneath an end portion of the conveying means 28 that protrudes beyond the side edge of the tank 44.

Figure 5:
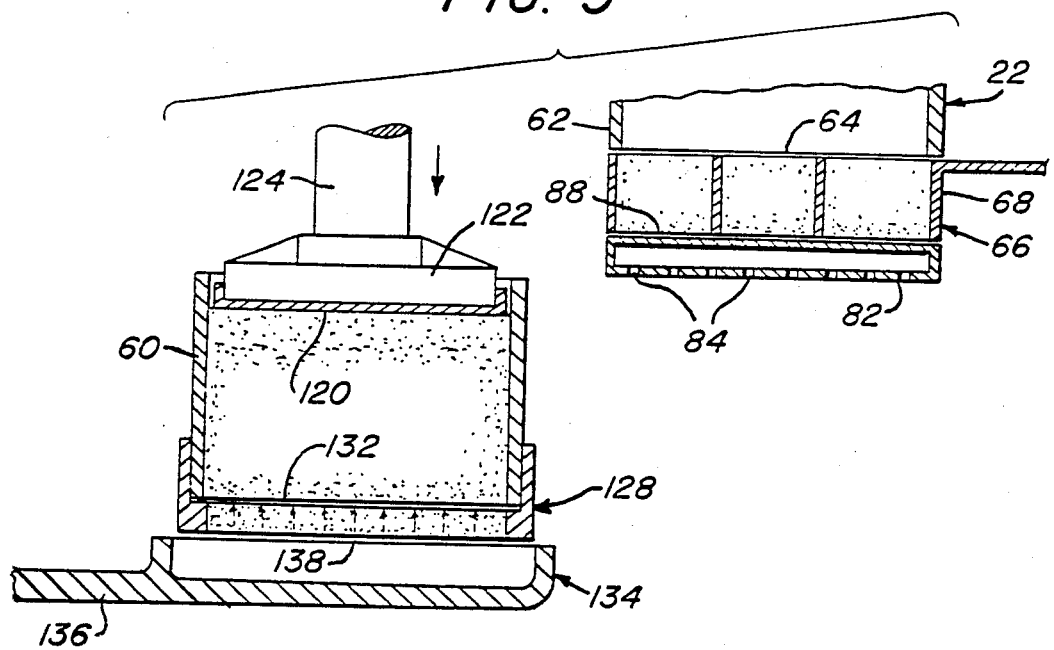
FIG. 5 is a schematic sectional view of the location of components at the initiation of a dispensing cycle for an individual order.
Figure 6:
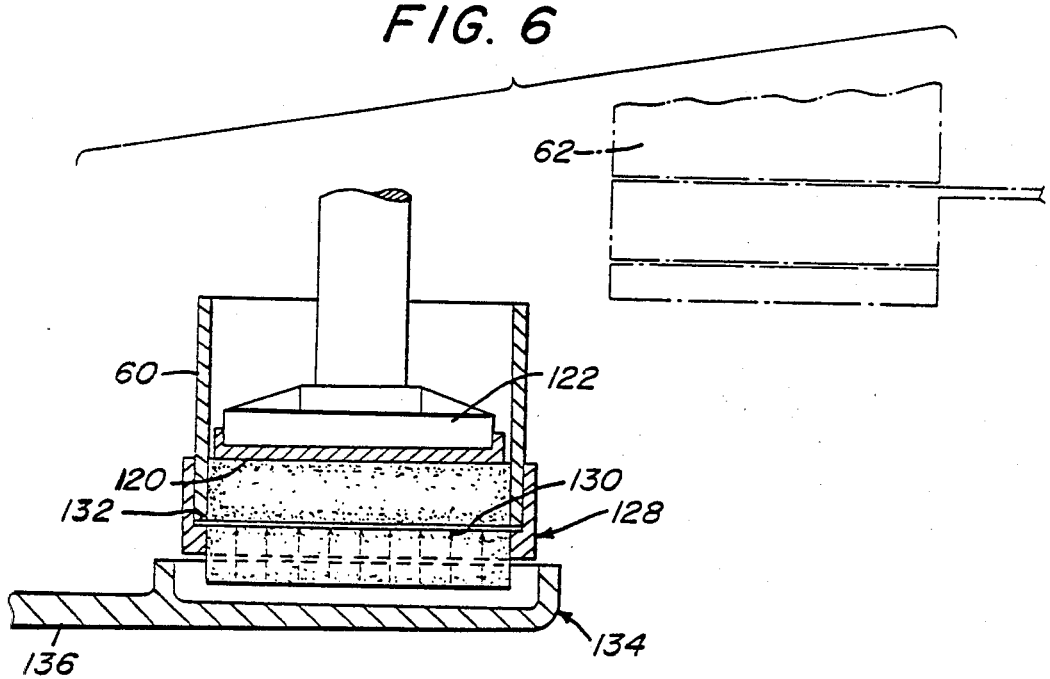
FIG. 6 is a view similar to FIG. 5 of the location of components during a subsequent portion of the dispensing cycle.
Figure 7:
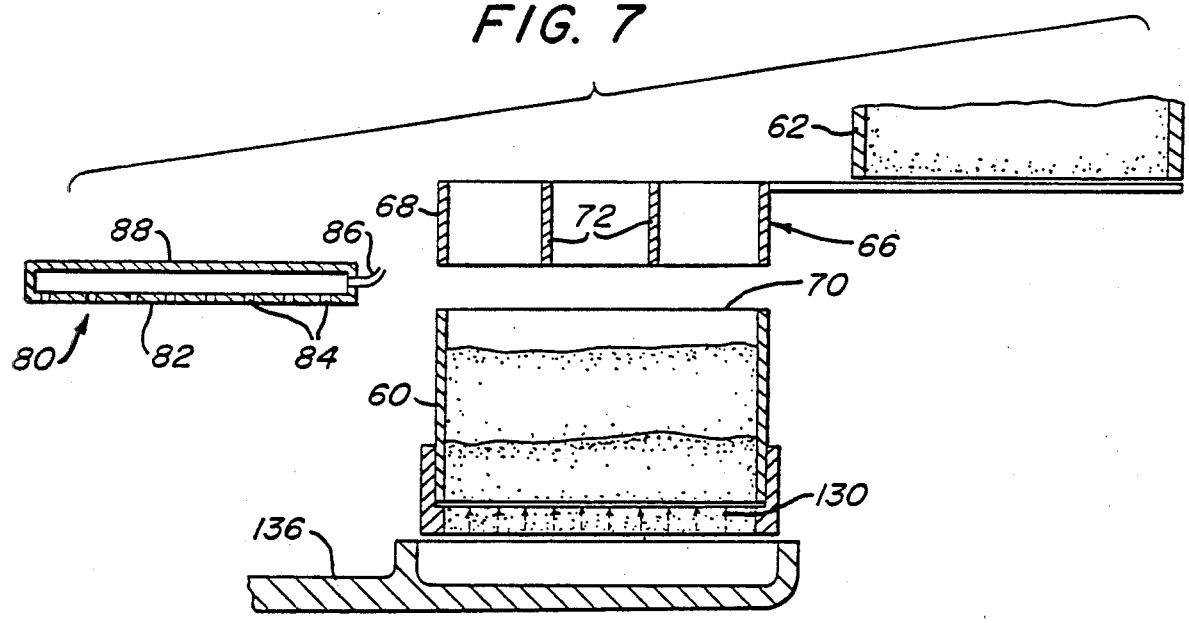
FIG. 7 is a view similar to FIG. 5 of the location of components during a portion of the reconstituting cycle.

Referring now to FIGS. 2 to 8, components of the systems of the apparatus 20 used to transfer dehydrated product from the hopper 22 to a rehydrating cylinder or chamber 60 are shown. As illustrated in FIGS. 2 and 5, the hopper 22 has a lower wall 62 defining an outlet 64 of the hopper. An agglomerate carrier, generally designated 66, has a carrying portion 68 with open upper and lower ends. As illustrated in FIG. 5, the carrying portion 68 is positionable in a first position in which the upper end of the carrying portion is aligned with the wall 62 defining the outlet 64 of the hopper 22. Further, as illustrated in FIG. 7, the carrying portion 68 is positionable in a second position in which the lower end of the carrying portion 68 is aligned with an inlet opening 70 of the rehydrating or mixing chamber 60. Preferably, the interior of the carrying portion 68 is divided by walls 72 into a plurality of chambers so as to provide for more even dispersion or spread of the agglomerate both within the carrying portion and within the chamber 60. It has been found that two walls making three compartments provide good results.

Figure 8:
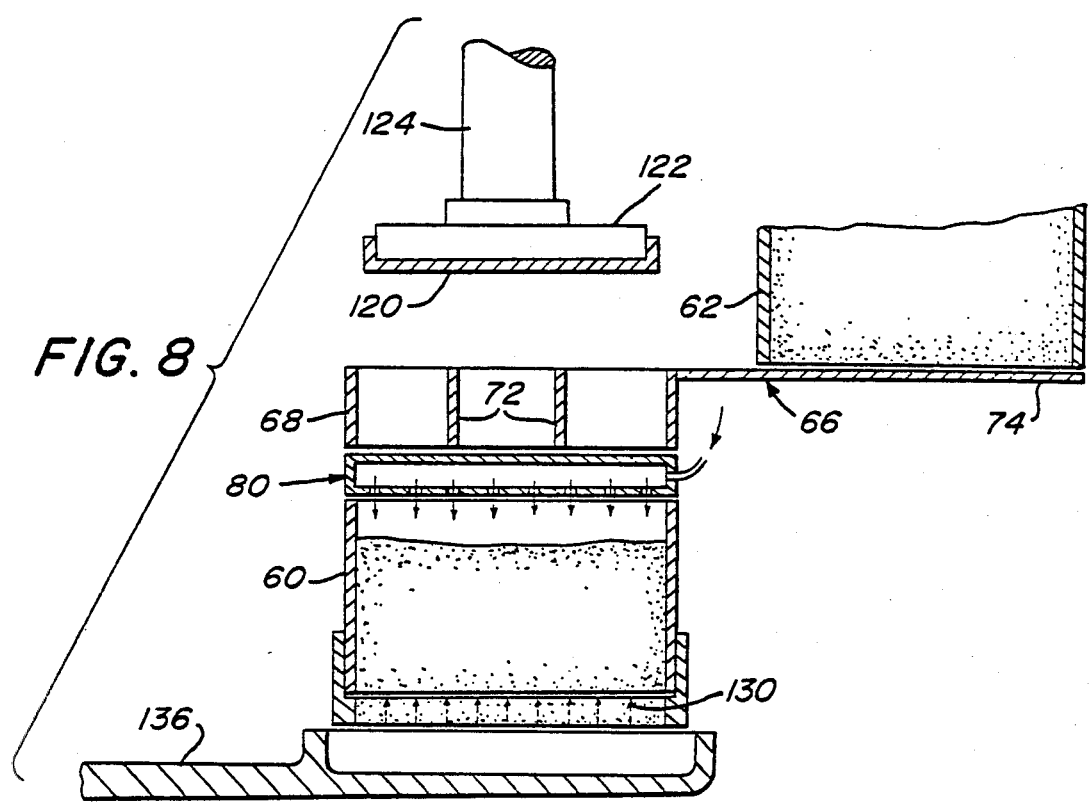
FIG. 8 is a view similar to FIG. 7 of the location of components during a subsequent portion of the reconstituting cycle.

As illustrated in FIGS. 3, 4, and 8, the agglomerate carrier 66 has a portion thereof 74 that closes the outlet 64 of the hopper 22 when the carrying portion 68 is in its second position. Appropriate guides (not illustrated) are preferably provided for guiding movement of the carrier 66 between its two extreme positions and for holding the carrier 66 in an aligned position with the outlet 64 or chamber 60.

A lever arm, generally designated 80, is schematically illustrated in FIGS. 2 to 4 and illustrated in plan in FIGS. 9 and 10. The lever arm 80 has one end portion thereof forming a shower head 82 that has a plurality of openings 84 for providing uniform dispersion of liquid, such as heated water, over dehydrated agglomerated material or other material in the mixing or rehydrating chamber 60. A plenum is provided above the openings to ensure dispersion of the liquid uniformly over all of the openings. The lever arm 80 is provided with suitable passageways or tubing 86 for connecting the plenum to a source or reservoir of the liquid to be dispensed. An upper surface of the shower head 82 forms a plate member 88 that, as best illustrated in FIG. 5, closes the lower end of the carrying portion 68 when the agglomerate carrier 66 is in its first position.

Suitable means, such as a spring-operated latch generally designated 90 in FIGS. 12 and 13, is provided for positively interconnecting the agglomerate carrier 66 and the lever arm 80 during movement of the carrying portion 68 from its first to its second positions. An end portion of the latch 90 is received in an aperture 91 of a plate 92 forming part of lever arm 80. A ramp-shaped member 93 is carried by the frame of the apparatus and is positioned to separate the latch 90 from the aperture 91 as the carrier 66 and arm 80 approach the second position. When the interconnected carrier 66 and lever arm 80 reach the second position, suitable means, such as a snubber 94 (illustrated in FIGS. 2 and 4) contacts the carrier 66 to prevent its continued movement with the lever arm 80. Other means, such as a solenoid-operated latch, are usable to provide releasable interconnection between lever arm 80 and carrier 66. The lever arm 80 is then movable independent of the carrier 66 to position the shower head 82 in a third position that is spaced from the inlet of the rehydrating chamber 60. As the shower head 82 moves towards its third position, the agglomerated material in the carrying portion 68 falls evenly into the inlet of the chamber 60 on top of reconstituted, rehydrated, or mixed material already in the chamber 60. Conjoint movement of the loaded carrier 66 and lever arm 80 is ensured by the provision of spaced apart guides 85 on the arm 80 and a member 87 protruding downwardly from the carrier 66. Also suitable springs are usable to bias the carrier 66 into its second position.

The shower head 82 is then returned to the second position thereof. Water is then fed to the shower head for dispersion on the material within the chamber 60.

Movement of the lever arm 80 is controlled by a drive member or rod 95 of a piston cylinder unit 96 connected to a second end 97 of the lever arm 80. During a first portion of the stroke of the rod 95, the lever arm 80 and the carrier 66 are conjointly moved from the first position in which the carrier is aligned with the outlet of the hopper and filled with material, to the second position in which the carrier is aligned with the inlet of the chamber 60. During a second portion of the movement of the rod, the shower head 82 is moved away from the bottom of the carrier so that the material in the carrier falls into and is evenly dispersed within the chamber 60. During a third portion of the movement of the rod, the shower head 82 is returned to a position in alignment with the inlet of the chamber 60. During a final portion of the movement of the rod, the carrier 66 and lever arm 80 are returned to their first positions.

Figure 15:
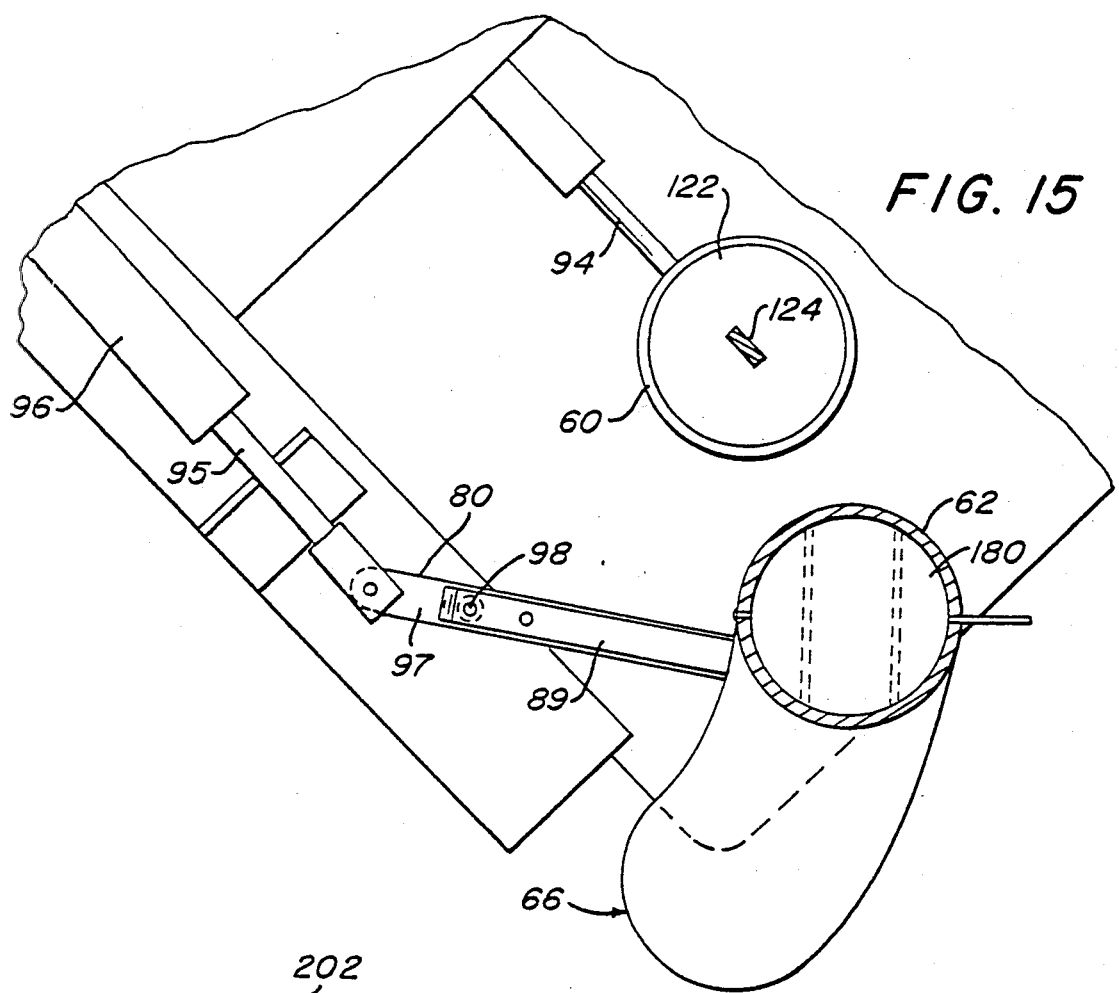
FIG. 15 is a schematic top view of a system used to control movement of system components during a reconstituting cycle.

As best illustrated in FIG. 15, both a lever arm 89 of the carrier 66 and an intermediate portion of lever arm 80 are movable about a common pivot pin 98. The pin 98 is a drop fit in an aperture provided in a portion of the machine frame so as to facilitate removal of the carrier 66 and lever arm 80 for cleaning. The other interconnections between system components also are designed to facilitate easy assembly and disassembly for cleaning, for instance, bayonet-type connections are used between driving and driven components.

Figure 11:
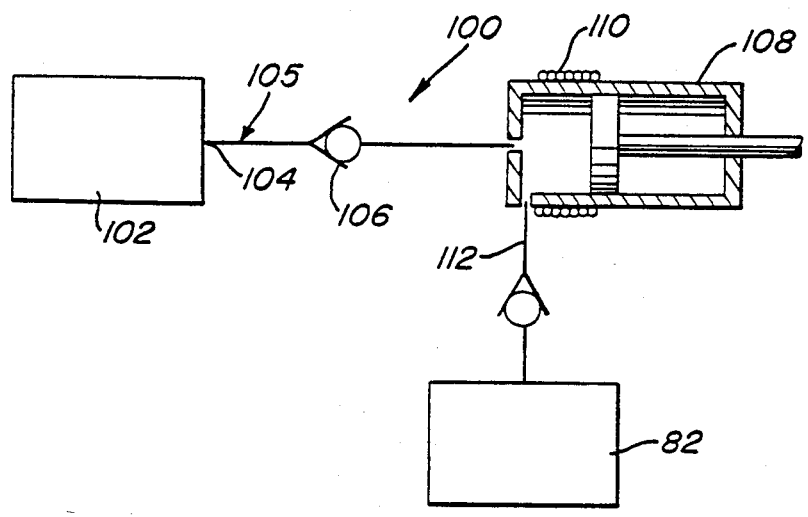
FIG. 11 is a schematic representation of one embodiment of a system for supplying liquid to the device of FIG. 9.

Referring now to FIG. 11, a suitable water supply system, generally designated 100, for supplying water to the shower head 82 is illustrated. The system 100 includes a reservoir 102, which is preferably heated, and which is connectable to a source of water. An outlet 104 of the reservoir 102 is connected by tubing 105, via a one-way valve 106, to an inlet of a piston cylinder device 108. Movement of a piston of the device in a first direction creates suction within the cylinder that draws a predetermined volume of water into the cylinder. Preferably, heating coils 110 surround the cylinder to maintain the liquid at a desired temperature or within a desired range of approximately 3° F. When the shower head 82 is located in its second position, the piston of the device 108 is actuated to feed the liquid through tubing 112 to the inlet of tubing 86. Provision of the heated piston cylinder device 108 to furnish water to the shower head 82 ensures that the required quantity of water at the right temperature is furnished to the shower head for discharge on the material within the chamber 60.

Since only one order is reconstituted at a time, it is extremely important to provide precise control of the amount of liquid or water furnished the rehydrating chamber. It has been found that an impeller pump provides undesirable fluctuations in the amount of liquid supplied because of variation in the position of the vane of the pump when a dispensing operation is initiated. With the piston-cylinder device used in the present invention, such variation is eliminated and control of variations as small as one gram is possible.

Another factor influencing proper reconstitution of the agglomerated material is control of the temperature of the added water. Heat loss is difficult to prevent from the tubing used to transport the water from the reservoir to the shower head. The affects of such heat loss are minimized by heating the cylinder of the device 108.

Still another factor influencing proper reconstitution of presently available product is the rate and manner in which water is added. Water should be applied uniformly over the surface of the product and should be influenced only by the force of gravity. Provision of the plenum in the shower head evenly distributes the supplied water as a thin film over all the openings and eliminates kinetic energy accumulated by the water during its passage from the reservoir. Movement of the piston of the piston-cylinder unit 108 is controlled so that water is furnished to the plenum at substantially the same rate as water leaving the plenum so that no hydrostatic head is developed.

After the water has been discharged onto the material, a waiting or curing period, for instance approximately 10 to 15 seconds, is provided to allow absorption of the water by the agglomerate. The reconstituted material in the lower portion of chamber 60 forms a barrier to prevent escape of the water from the chamber. After the expiration of the curing period, the material, when properly reconstituted, forms a potato agglomerate mixture that is formable dough. As the mixture is being cured, the carrier 66 and arm 80 are returned to the first positions thereof in alignment with the outlet of the hopper 22. As the carrier 66 moves into its first position, it is automatically filled with material to be reconstituted. When the carrier is in its first position and filled with material, it is ready for initiation of the next reconstitution cycle.

After curing, the reconstituted material is ready to be forced out of the chamber 60 by the end face 120 of a piston 122 during the next dispensing cycle of operation. The duration of the preceding dispensing cycle is sufficiently long to allow curing of the mixed product. Movement of the piston into and out of the chamber 60 is controlled by a rod 124. Preferably, an upper portion of the rod is formed with ratchets 126 that are engaged by a suitable gear (not illustrated). Rotation of the gear is controlled by a motor that is intermittently started and stopped to advance the rod 124 and piston 122 by discrete, predetermined distances into the chamber 60.

Alternatively, a rod of a piston-cylinder unit is connected to an upper end of rod 124 to control movement of the piston 122 into and out of the chamber 60. As with the illustrated embodiment, the rod 124 has a portion carrying marking indicia, such as a serrated portion. When a dispensing cycle is initiated, the piston-cylinder unit is energized to advance rod 124 into the rehydrating chamber 60. A sensing device senses movement of the indicia on rod 124 to deenergize the piston-cylinder unit and energize a cutting mechanism. After completion of a cutting cycle, the piston-cylinder unit is again energized and the process repeated.

Advancement of the piston into the chamber 60 forces the agglomerated material through a die head, generally designated 128, that has a plurality of wires or plates 130 positioned within or adjacent to the lower outlet end 132 of the chamber 60. The individual plates 130 are spaced from each other by a distance corresponding to the desired width of each piece formed from the material forced out of the chamber 60 by the piston 122. The distance between side walls supporting the plates determines the lengths of the individual pieces. After the dough or agglomerated material is moved by the piston a predetermined distance corresponding to the desired thickness of the piece, the motor driving the rod 124 is stopped, and a cutting or severing mechanism, generally designated 134, is actuated. The cutting mechanism includes a carrier or support 136 that has upwardly extending arms supporting a cutting knife or wire 138. The wire 138 is closely spaced from the lower end of the die head 128 so as to sever material forced out of the cylinder 60 from material remaining within the cylinder. Preferably, the individual pieces severed by the wire 138 resemble potato pieces suitable for french frying. Movement of the piston 122 into the cylinder 60 is synchronized with movement of the cutting mechanism 134 so that only one of the two is energized at a given time.

One embodiment of the invention provides eleven individual cut pieces each time the knife 138 is moved across the outlet of the die 128. It is presently comtemplated that an individual order would contain thirty-three individual cut pieces. Thus, the piston 122 is incrementally advanced three times and the knife 138 is advanced three times to provide a total of thirty-three individual cut pieces. It should be readily apparent that the number of incremental advancements and the number of cutting strokes are a function of the desired size of the order.

Preferably, the end face 120 is connected to the piston 122 so that the end face is movable with respect to the piston. When the rod 124 withdraws the piston from the chamber 60, the end face pivots with respect to the piston to prevent creation of a vacuum within the chamber that might tend to remove the agglomerated product from the upper or inlet end of the chamber.

Referring now to FIGS. 1 and 16, components of the means for heating individual orders 26 and the means for conveying 28 are illustrated. As previously mentioned, the heating means 26 includes a tank 44 filled with cooking liquid up to a level 46. The conveying means 28 includes a belt or revolving wire conveyor 140 that has a plurality of openings formed therein to allow drainage of heating or cooking liquid from a heated product. The belt is rotated by a drive 142 connected by a pin-and-slot or bayonet-type connection to an output shaft of a motor. The direction of rotation of the shaft is reversible to drive the belt 140 in either a first direction in which the belt carries severed product into the tank 44, or in a second direction in which the belt carries heated product towards the outlet 30 of the apparatus. When the belt is driven in the first direction, a clutch 144 is engaged to rotate a frame 145 suporting the conveyor 140 about a pivot 146 so that an end portion 148 of the belt is moved from a first position above the level of liquid in the tank to a second position in which the end portion extends below the level of liquid. The clutch includes a spring that ensures slippage after the lower portion of the frame or a bracket attached to the frame contacts the bottom of the tank. Rotation of the belt in the opposite direction results in return of the submerged end portion 148 to a position spaced above the level of liquid within the tank.

The end portion 148, as illustrated, extends at an angle to the main portion of the belt 140. The portion of the frame 145 supporting end portion 148 also supports side walls and an end wall of a basket 149. The belt 140 forms another end wall of the basket, and the end portion 148 forms the bottom of the basket. Portions of the basket side walls extend below the belt 140 so as to contact the bottom of tank 44 to thereby define the second position of the belt.

It is preferable for the conveyor belt to be oriented in its second position with the end portion 148 below the level of the liquid prior to severing of the first individual pieces. Also, it is desirable to provide a damping mechanism to limit the rate of movement of the conveyor into the tank to prevent splashing of the liquid in the tank. The severed individual pieces fall either directly into the tank or on to conveyor 140 and then into the tank and strike the liquid which ensures separation of the individual pieces from each other. The conveyor belt 140 carries the pieces into the basket 149, and ensures separation of the pieces severed during a preceding operation from those severed during a succeeding operation. After the desired number of individual pieces has been severed and heated, the drive of the belt is reversed so as to deliver the individual heated pieces toward the outlet of the apparatus. Although the first severed pieces are heated longer than the last severed pieces, for instance four or five seconds, the differential in heating time does not adversely affect the quality of the finished product.

Figure 14:
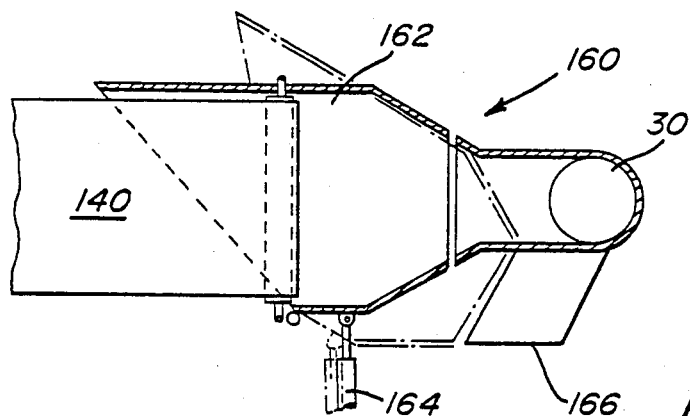
FIG. 14 is a schematic top view of an outlet portion of the apparatus of FIG. 1.

A chute 160 interconnects the end of the conveyor 140 with the outlet 30. As best illustrated in FIG. 14, a portion 162 of the chute is movable by a solenoid-operated plunger 164 between a first position in which heated product is directed to the outlet 30 and a second position, illustrated in phantom, in which heated product is directed to a waste receptacle 166.

Another feature of the present invention is the provision of a damper 180 in the outlet chute of the hopper 22. The damper 180 is movable by a control member 182 located outside of the chute. The damper 180 is provided to minimize the effect of the weight of material in the hopper 22 on the feeding of the material. The angle of the damper is adjustable to vary the size of the space used to feed material. When the ambient humidity is relatively low, the material is lighter and tends to flow freely. As humidity increases, the material becomes heavier and flows less freely. Adjustment of the damper 180 provides a means for compensating for such variations in the flow rates of material. The damper 180 also is movable into a position blocking flow of material out of the hopper 22. The damper is located in this position when the lever arm 80 is removed for a cleaning operation.

Figure 17:
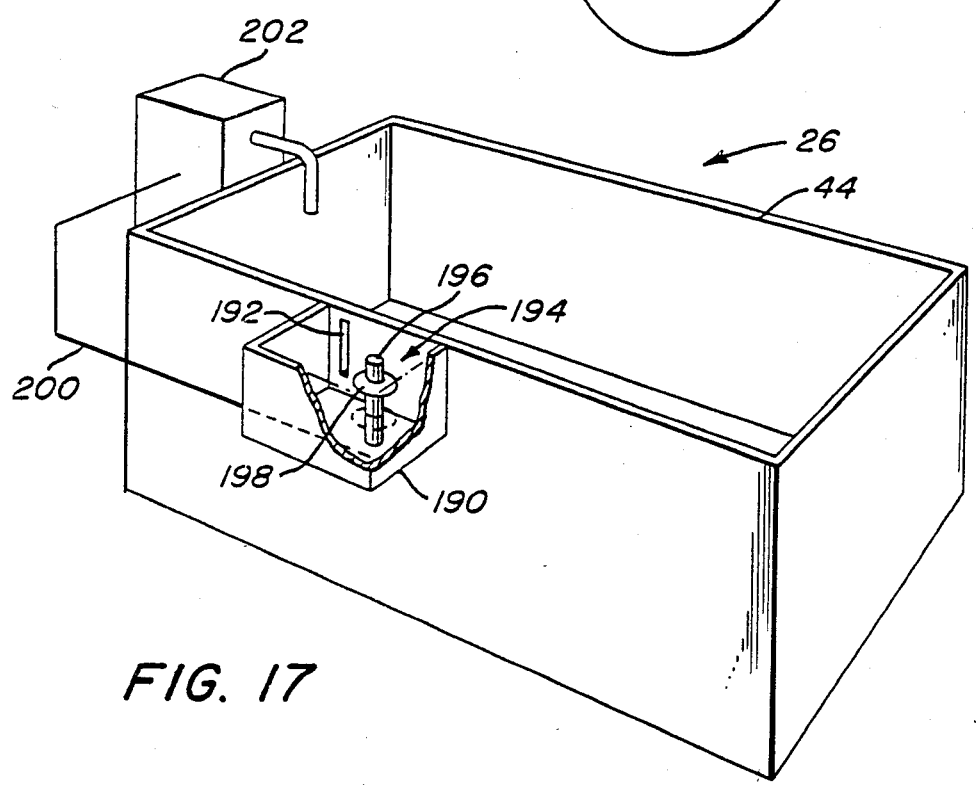
FIG. 17 is a schematic representation of a system used to maintain the level of heating or cooking liquid within desired levels.

Referring now to FIG. 17, a system or means for automatically replenishing or adding liquid to the tank 44 is illustrated. The system includes a container 190 that is supported by an exterior wall of the tank 44. The container 190 is connected to the interior of an upper portion of tank 44 by a slot 192. As a result, the level of liquid within the container 190 will be the same as that in tank 44, after the liquid level in the tank rises above the bottom of the slot. A conventional electronic liquid level sensing device, generally designated 194, is disposed within the container 190. The device 194 has a shaft 196 supported by the container and a sensing element 198 slidably guided on the shaft that floats or is partially submerged in the liquid. The interaction between the shaft and sensing device is such that an electrical signal is generated that is representative of the position of the sensing device. Such signal is fed, via a line 200, to a device 202 for adding liquid to the tank.

When the sensing device falls below a predetermined level, such as the position illustrated in phantom in FIG. 17, a signal is generated to energize a pump or open a valve of the device 202 to add liquid to tank 44. When the sensing device is above a predetermined level, such as the solid line position in FIG. 17, the device 202 is deenergized.

In a typical sequence of operations, it is assumed that two fully mixed patties, each being the size of a desired individual order, are already fully mixed within the chamber 60. If the chamber 60 is not loaded, it will be necessary to first insert a preformed pattie or blank within the lower end portion of the chamber 60 to provide a barrier for material and liquid introduced into the chamber 60.

The sequence of operations is initiated by insertion of a card, control signal, or one or more coins into the coin-operated mechanism 38. The mechanism 38 generates an appropriate control signal to start an order dispensing cycle, followed by a pattie making or reconstituting cycle. The dispensing cycle which includes heating or cooking, takes approximately sixty seconds, while the pattie making cycle takes approximately thirty seconds. The pattie making cycle occurs simultaneously with a portion of the heating cycle so that overall machine cycle time is kept to a minimum.

Initially, the conveyor drive mechanism is energized to position the basket 149 below the level of liquid in the heating tank. Next, the piston 122 is advanced by a predetermined amount into the chamber 60 to force material through die head 128. Movement of the piston is stopped and the cutting mechanism 134 is actuated to commence a severing operation. This procedure is repeated the desired number of times, for instance three times, to obtain a requisite number of individual cut pieces. After a sufficient amount of dough has been forced through the die head, the piston 122 is removed from the upper or inlet end of the chamber 60.

While the severed product is being heated, the reconstituting cycle is started by actuating the piston cylinder unit 92 to transfer the agglomerate carrier 66 and shower head 82 from the first or fill position to the second or discharge position. As the carrier 66 is moving from the first toward the second position, the sealing portion 74 of the carrier progressively closes the outlet of the hopper 22. Movement of the carrier 66 is stopped in the second position, while movement of the shower head 82 continues to progressively clear the plate member 88 from the outlet of the carrier body 68. As the outlet is cleared, the contents of the carrier are discharged into the mixing cylinder 60. After all of the contents have been discharged, the shower head 82 is returned to the second position. Water is then supplied to the shower head and falls under the force of gravity onto the agglomerate within the cylinder. If necessary, an air blast is used to purge all water from the shower head and to assist in the mixing of the agglomerate and water. The agglomerate carrier and base or shower head 82 are then returned to the first or fill position so that the carrier can be refilled with material from the hopper. The piston 122 is then moved into the chamber 60 to seal the chamber and protect its contents. The material within the chamber 60 becomes reconstituted prior to the end of the order dispensing cycle. As a result, the next order dispensing cycle can be initiated as soon as the previous cycle is terminated. Return of the piston into the cylinder ends the pattie-making portion of the sequence of operations and readies the system for the next dispensing operation.

The frying or heating portion of the order dispensing cycle commences with energization of the drive 142 to move the belt conveyor in the first direction for conveying severed products into the tank. Movement of the belt in the first direction engages the clutch 144 so that the end portion 148 is pivoted into the hot cooking liquid or oil within the tank 44. The belt is located in such position prior to severing the first part of the order. Severed products are carried by the belt into the cooking oil for a period of approximately fifty seconds, depending on the characteristics of the product and the temperature of liquid in tank 44. The wire frame basket 149 is positioned around the end portion 148 to accumulate the first portion of the order. The drive 142 is then reversed so that the belt conveyor runs in a direction conveying heated or cooked products towards the outlet of the apparatus. Movement of the belt conveyor in this direction results in withdrawing of the end portion 148 from the tank and conveying of the heated products to the upper or inlet end of the chute 160. The chute 160 delivers the heated products to a cup positioned on the platform 36. Dispensing of the cup onto the platform is in response to a signal generated by the coin-operated mechanism 38. Preferably, the mechanism 38 also generates a signal that results in a container of accessories being dispensed by the dispenser 40.

A conventional sensor 170 is provided for sensing when the hopper 22 is empty of material. Another conventional sensor 172 senses when the dispenser 32 is out of cups. A third sensor 174 senses when the accessory dispenser 40 is empty. An "empty" signal is generated by the sensor either when the sensed container is empty or when a blockage prevents proper feeding. The control system of the apparatus prevents actuation of the apparatus upon generation of an "empty" signal by any of the sensors.

While the dehydrated product presently used in the apparatus is relatively stable when dry, the rehydrated or reconstituted product tends to decompose with the passage of time. One of the features provided by the present invention is the provision of a mechanism for sensing the lapse of time between two orders. When the lapse of time between a preceding and a succeeding order exceeds a predetermined period of time, for instance, two hours, the control system generates a signal initiating a dispensing operation. The control signal generates the same sequence of operations as that generated by the insertion of a coin or coins into the coin-operated mechanism, except that cup and accessory dispensing signals are not generated. In addition, the solenoid controlling the plunger 164 is actuated to move the chute 162 into alignment with the waste receptacle 166 for a period of time sufficient to divert the product produced during the cycle.

From the preceding, it should be noted that the present invention, automatically and without manual intervention, provides a product similar to a freshly fried french fried potato from a mixture of a dried powder and water, while at the same time creating a minimum amount of waste of unused product. Advantages stemming from use of a dehydrated product include a much higher storage capacity within the apparatus, for instance, the capacity to store sufficient quantity of product to fill at least six hundred orders. Further, use of a dehydrated product avoids the problems associated with deterioration of fresh or frozen product due to atmospheric and ambient conditions. Waste is kept to a minimum by rehydrating only one portion of dehydrated potato at a time. Another advantage of the use of a reconstituted product is that the "cooking" time can be reduced significantly. Since the product is cooked during the initial dehydrating process before the product is stored in the machine, the reconstituted product need be cooked or heated only long enough to warm the interior and brown the exterior. This provides a much faster cycle time than is possible when cooking fresh or frozen products.

One embodiment of the present invention utilizes a hydraulic logic system to control the pattie making operation and an electronic system to control other functions of the apparatus. It should be readily apparent that an entirely electronic system could be used to control the various functions of the apparatus. Thus, the particular form of logic used to control the movement of the components of the apparatus has not been described in detail.

Previously, a specific embodiment of the present invention has been described. It should be appreciated, however, that such embodiment has been described for the purposes of illustration only, without any intention of limiting the scope of the present invention. Rather, it is the intention that the present invention be limited only by the appended claims.

What is claimed is:

1. A method of dispensing individual orders of a cooked food product using an apparatus contained in a housing, said method comprising:

supplying to a mixing chamber a quantity of dehydrated food product corresponding in quantity to the size of an order to be dispensed;

adding sufficient liquid to the mixing chamber to rehydrate the dehydrated food product;

intermittently forcing a predetermined quantity of the rehydrated product out of an outlet of the mixing chamber;

intermittently severing a portion of the rehydrated product as it forced from the outlet of the mixing chamber;

positioning a tank of heated cooking liquid below the outlet of the mixing chamber for receiving the severed food product;

providing a conveyor belt having a first end and a second end;

positioning the first end portion of the conveyor belt within the tank and below the level of liquid in the tank prior to severing of the food product;

positioning the second end of the conveyor belt adjacent a dispensing chute positioned within said housing;

depositing the severed food product on the conveyor belt;

driving the conveyor belt in a direction conveying the severed food product into the tank below the level of the liquid;

heating the severed food product in the tank of heated cooking liquid; and reversing the driving direction of the conveyor belt to carry cooked food products out of the cooking liquid so that an individual order of cooked food product is delivered to the dispensing chute.

2. A method of dispensing individual orders of a cooked food product using an apparatus contained in a housing, said method comprising:

supplying to a carrier a quantity of dehydrated food product corresponding to the size of an order to be dispensed;

moving the carrier to transfer the supplied food product to an inlet of a rehydrating chamber;

adding liquid to the rehydrating chamber to thereby reconstitute the food product;

intermittently forcing the reconstituted food product out of an outlet of the rehydrating chamber;

severing the food product forced from the outlet of the rehydrating chamber;

positioning a tank of cooking liquid below the outlet of the rehydrating chamber for receiving severed food product;

positioning an end portion of a conveyor belt below the level of cooking liquid in the tank prior to severing of the food product and driving the conveyor belt in a direction to convey severed food product into the tank, the severed food product sinking below the level of the cooking liquid;

reversing the driving direction of the conveyor belt and moving the end portion of the conveyor belt out of the cooking liquid so that an individual order of cooked food product is conveyed from the cooking liquid to a dispensing chute positioned within the housing.

3. A method according to claim 2, further comprising:

sensing the insertion of a coin into the housing containing the apparatus; and initiating the dispensing of an individual order upon the sensing of the insertion of the coin.

4. A method according to claim 2 further comprising:

sensing the lapse of time following the dispensing of a first order; and initiating the dispensing of a second order when the sensed lapse time exceeds a predetermined time.

5. A method of dispensing individual orders of a cooked food product using an apparatus contained in a housing, said method comprising:

supplyung a dehydrated food product to a rehydrated chamber having a downwardly facing discharge opening;

adding water to the dehydrated food product to rehydrate the same to a predetermined consistency to provide an intermediate food product;

providing a die head below the rehydration chamber and adjacent to the discharge opening, the die head including laterally spaced product-cross-section-defining means defining a predetermined shape of the product;

forcing a portion of the intermediate food product from the rehydration chamber and through the die so that it partially extends beyond a downwardly facing outlet of the die;

passing a wire cutting knife along the die outlet to sever the portion of the intermediate food product that extends beyond the die outlet to provide a plurality of laterally separated intermediate food products having a predetermined shape, the separated intermediate food products individually falling vertically from the die outlet under the influence of gravity and in laterally separated condition;

providing cooking apparatus to receive the laterally separated intermediate food products and cook the same to provide the desired final cooked product; and providing conveyor belt means to deliver the cooked product from the cooking apparatus to a dispensing means positioned within the housing.

6. A method according to claim 5 including the following additional steps:

providing a laterally movable conveyor under the die outlet;

permitting the severed and laterally separated intermediate food products to fall onto the conveyor in laterally separated relationship;

conveying the intermediate food products to the cooking apparatus, whereby the conveyed intermediate food products are in separated condition and are of a regular shape in substantially the form they were in at the same time they were severed from the die outlet.

7. A method according to claim 5 including the additional step of permitting the severed and laterally separated intermediate food products to fall under the influence of gravity into the cooking apparatus.

8. An apparatus for preparing predetermined portions of a hot food product by rehydrating and cooking a dehydrated food product, said apparatus comprising:

rehydration chamber means having inlet means for receiving a predetermined quantity of a dehydrated food product and a liquid and having an outlet for dispensing a rehydrated food product;

liquid distribution means for adding a predetermined amount of liquid to the dehydrated food product in said rehydration chamber means;

means for forcing the rehydrated food product out of the outlet of said rehydration chamber means;

die means positioned at the outlet of said rehydrating chamber means to define a plurality of rehydrated food product pieces of predetermined cross section and of a length greater than the width thereof, said die means including an outlet opening having an axis extending in a substantially vertical direction so that the rehydrated food product that passes through said die means exits therefrom in a substantially vertical direction;

cutting means disposed adjacent said die means for cutting off a portion of the rehydrated food product forced out of said rehydration chamber means;

cooking means for receiving and cooking the cut off rehydrated food products to provide a cooked food product; and conveyor belt means for removing cooked food product from the cooking means and for conveying the cooked food product to a dispensing means.

9. The apparatus of claim 5 wherein said die means includes a plurality of spaced, substantially parallel divider members to define a plurality of dehydrated food product pieces of generally rectangular cross section.

10. The apparatus of claim 9 wherein the divider members are spaced plates.

11. The apparatus of claim 9 wherein the divider members are spaced wires.

12. The apparatus of claim 8 wherein said cutting means includes a knife.

13. The apparatus of claim 8 wherein said cutting means includes a wire.

14. The apparatus of claim 8 wherein said cutting means is supported to move across the outlet of said die means in a direction along the length dimensions of said rehydrated food product pieces.

15. The apparatus of claim 8 wherein said die means includes a plurality of spaced, substantially parallel wire divider members to define a plurality of rehydrated food product pieces of generally rectangular cross-section, and said cutting means including a wire supported to move across the outlet opening of said die means in a direction along the length dimension of said rehydrated food product pieces.

* * * * *